:::

(12) United States Patent
Hays et al.

(10) Patent No.: US 7,707,490 B2
(45) Date of Patent: Apr. 27, 2010

(54) SYSTEMS AND METHODS FOR FLEXIBLE REPORT DESIGNS INCLUDING TABLE, MATRIX AND HYBRID DESIGNS

(75) Inventors: Christopher Alan Hays, Monroe, WA (US); Jason David Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 155 days.

(21) Appl. No.: 10/875,832

(22) Filed: Jun. 23, 2004

(65) Prior Publication Data

US 2005/0289455 A1  Dec. 29, 2005

(51) Int. Cl.
*G06F 17/16* (2006.01)
*G06F 17/15* (2006.01)

(52) U.S. Cl. .................... 715/234; 715/212; 715/214; 715/219; 715/227

(58) Field of Classification Search ................ 715/522, 715/102, 212, 214, 219, 227; 707/102
See application file for complete search history.

(56) References Cited

U.S. PATENT DOCUMENTS

| | | | |
|---|---|---|---|
| 5,255,356 A * | 10/1993 | Michelman et al. ......... 715/504 |
| 5,317,686 A | 5/1994 | Salas et al. | |
| 5,418,950 A | 5/1995 | Li et al. | |
| 5,504,885 A | 4/1996 | Alashqur | |
| 5,603,025 A | 2/1997 | Tabb et al. | |
| 5,809,266 A | 9/1998 | Touma et al. | |
| 5,832,532 A | 11/1998 | Kennedy et al. | |
| 6,065,012 A | 5/2000 | Balsara et al. | |
| 6,195,653 B1 * | 2/2001 | Bleizeffer et al. ............... 707/2 |
| 6,271,845 B1 | 8/2001 | Richardson | |
| 6,298,342 B1 | 10/2001 | Graefe et al. ................. 707/4 |
| 6,463,442 B1 | 10/2002 | Bent et al. | |
| 6,496,836 B1 * | 12/2002 | Ronchi et al. ............ 707/104.1 |
| 6,549,907 B1 | 4/2003 | Fayyad et al. | |
| 6,633,882 B1 | 10/2003 | Fayyad et al. | |
| 6,687,873 B1 | 2/2004 | Ballantyne et al. | |
| 6,920,608 B1 | 7/2005 | Davis | |
| 6,985,895 B2 | 1/2006 | Witkowski et al. | |
| 7,082,569 B2 * | 7/2006 | Voshell ....................... 715/503 |
| 7,302,444 B1 | 11/2007 | Dunmore et al. | |

(Continued)

OTHER PUBLICATIONS

Nirmal, N., "Normal Form of Extended Table Matrix L Systems," *Information Sciences*, 1986, 39, 153-173.

(Continued)

*Primary Examiner*—Stephen S Hong
*Assistant Examiner*—Wilson Tsui
(74) *Attorney, Agent, or Firm*—Woodcock Washburn LLP

(57) ABSTRACT

Columns and/or rows of a report can be declaratively defined as either dynamic or static. The declarative definition can be represented by any marking. If a column or row is declaratively designated as dynamic, it can be expanded into a plurality of columns or rows. If a column or row is designated as static, it remains as a single column or row to represent only the specified column or row data. Subgroups of columns and rows can also be declaratively defined as dynamic or static. A static column or row may contain no sub-columns/rows, or it may contain a plurality of static columns/rows, a plurality of dynamic columns/rows, or any combination of both. Similarly, a dynamic column or row may also contain the above combinations.

21 Claims, 8 Drawing Sheets

U.S. PATENT DOCUMENTS

| | | | |
|---|---|---|---|
| 2001/0044811 A1 | 11/2001 | Ballantyne et al. | |
| 2001/0047372 A1* | 11/2001 | Gorelik et al. | 707/514 |
| 2001/0049699 A1 | 12/2001 | Pratley et al. | |
| 2002/0073105 A1 | 6/2002 | Noguchi et al. | |
| 2002/0091681 A1 | 7/2002 | Cras et al. | |
| 2002/0154161 A1* | 10/2002 | Friedman et al. | 345/740 |
| 2003/0115194 A1 | 6/2003 | Pitts et al. | |
| 2003/0149646 A1* | 8/2003 | Chen et al. | 705/35 |
| 2003/0154277 A1 | 8/2003 | Haddad et al. | |
| 2003/0208460 A1 | 11/2003 | Srikant et al. | |
| 2004/0003138 A1 | 1/2004 | Finocchio | |
| 2004/0066410 A1 | 4/2004 | Lindhorst et al. | |
| 2004/0088158 A1 | 5/2004 | Sheu et al. | |
| 2004/0088650 A1 | 5/2004 | Killen et al. | |
| 2004/0111666 A1 | 6/2004 | Hollcraft | |
| 2004/0117731 A1* | 6/2004 | Blyashov | 715/507 |
| 2004/0193435 A1 | 9/2004 | Fang | |
| 2004/0205010 A1 | 10/2004 | Hamer et al. | |
| 2004/0268371 A1 | 12/2004 | Carrell et al. | |
| 2005/0010597 A1 | 1/2005 | Potter et al. | |
| 2005/0039033 A1* | 2/2005 | Meyers et al. | 713/193 |
| 2005/0166139 A1 | 7/2005 | Pittman et al. | |
| 2005/0246341 A1 | 11/2005 | Vuattoux et al. | |
| 2006/0048045 A1 | 3/2006 | Lehenbauer et al. | |
| 2006/0294098 A1 | 12/2006 | Thomson et al. | |
| 2007/0050697 A1 | 3/2007 | Lewis-Bowen et al. | |
| 2007/0081197 A1 | 4/2007 | Omoigui | |
| 2008/0046861 A1 | 2/2008 | Grieser | |
| 2008/0104091 A1 | 5/2008 | Chin | |

OTHER PUBLICATIONS

U.S. Appl. No. 10/400,375, filed Mar. 27, 2003, Hays et al.
U.S. Appl. No. 10/400,734, filed Mar. 27, 2003, Hays et al.
Stinson et al., "Creating a Pivot Table; Pivoting a Pivot Table," Microsoft Office Excel 2003, 2003, p. 800-806, XP 002461558, Figures 30-2, 30-7.
Stevens, Craig and Dodge, Mark; "Microsoft Office Excel 2003 Inside Out," Microsoft Press, 2003.
Feibus, A., "Crystal Reports Upgrade is Useful, Not Dramatic," Information Week, 1999, 721, 130-131.
Gray, J. et al., "Data Cube: A Relational Aggregation Operator Generalizing Group-By, CrossTab, and Sub-Totals," Proceedings of the Twelfth International Conference on Data Engineering, New Orleans, Louisiana, Feb. 26-Mar. 1, 1996, 152-159.
Hanna, Interactive Visual Functional Programming, ACM 2002, pp. 1-12.
Jern, M., "3D Data Visualization on the Web," Proceedings 1998 MultiMedia Modeling, Lausanne, Switzerland, Oct. 12-15, 1998, 90-99.
Johnson, Yvonne, et al., "Special Edition, Using Borland Paradox 7 for Window 95 and Windows NT," Que Corporation, 1996; Lib. of Cong. Cat. No. 95-71446; ISBN: 1-7897-0205-3; pages. title, 213-30, 303-16, 382-85, 413-17, 522-25, 557-64, and 587-88.
Lisper et al., Haxcel: A Spreadsheet Interface to Haskell, Google 2002, 14th International Workshop on the implementation of functional language, pp. 1-17.
Papakonstantinou et al. Qursed: Querying and Reporting Semistructured Data, ACM 2002, pp. 192-203.
"Portals Marry Structured, Unstructured Data," I/S Analyzer Case Studies, 2002, 41(10), 1, 5-7.
Seymour, G., "Sum You Win, Sum You Lose (Accountancy Software)," Personal Computer Magazine, 1995, 134-136, 139-140, 142-143, and 145-146.
Stolte, C. et al., "Polaris: A System for Query, Analysis, and visualization for Multidimensional Relational Databases", IEEE Trans, Visualization Comp. Graphics, 2002, 8(1), 52-65.
Sunita, S., "Explaining Differences in Multidimensional Aggregates", Proceedings of the Twenty-Fifth International conference on Very Large Data Bases, Orlando, Florida, Sep. 7-10, 1999, 42-53.
USPTO Interim Guidelines for Examination of Patent Applications for Patent Subject Matter Eligibility, pp. 1-59, Oct. 26, 2005.
In the United States Patent and Trademark Office, Non Final Office Action dated Sep. 8, 2005, 31 pages, in U.S. Appl. No. 10/400,734, filed Mar. 27, 2003.
In the United States Patent and Trademark Office, Final Office Action dated Feb. 15, 2006, 37 pages, in U.S. Appl. No. 10/400,734, filed Mar. 27, 2003. 73.
In the United States Patent and Trademark Office, Non Final Office Action dated Jun. 13, 2006, 32 pages, in U.S. Appl. No. 10/400,734, filed Mar. 27, 2003.
In the United States Patent and Trademark Office, Final Office Action dated Dec. 4, 2006, 16 pages, in U.S. Appl. No. 10/400,734, filed Mar. 27, 2003.
In the United States Patent and Trademark Office, Final Office Action dated Aug. 12, 2008, 6 pages, in U.S. Appl. No. 10/927,894, filed Aug. 27, 2004.

* cited by examiner

| Customer (101) | Year (102) | Sales (103) |
|---|---|---|
| Acme (101a) | | |
| | 2001 (102a) | $ 13,312 (103a) |
| | 2002 (102b) | $ 11,156 (103b) |
| | Total (102c) | $ 24,468 (103c) |
| Bob's Discount (101b) | | |
| | 2001 (102d) | $ 6,421 (103d) |
| | 2002 (102e) | $ 1,523 (103e) |
| | Total (102f) | $ 7,944 (103f) |
| Grand Total (101c) | | $ 32,412 (103g) |

Static Columns 104

Dynamic Rows 105

Group Header 106

Group Footer 107

*(Prior Art)*

Fig. 1

| Salesman (201) | 1990 Sales (202) | Total Sales (205) |
|---|---|---|
| | | |

*(Prior Art)*
Fig. 2

| Salesman (301) | 1990 Sales (302) | Total Sales (305) |
|---|---|---|
| Bob (301a) | $9762 (302a) | $17,251 (305a) |
| Martha (301b) | $867 (302b) | $11,629 (305b) |
| Hank (301c) | $656 (302c) | $16,101 (305c) |

|  |  | Year 700 |  | Region 701 | Total 702 |
|---|---|---|---|---|---|
|  |  | [Yearly Sales] 703 | Growth 704 | [Region] 705 |  |
| [Category] 706 | Header 707 |  |  |  |  |
|  | [Store] 708 | Sum(Sales) 710 | (Growth) 712 | Sum(Sales) 714 | Sum(Sales) 716 |
| Grand Total 709 |  | Sum(Sales) 711 | Average (Growth) 713 | Sum(Sales) 715 | Sum(Sales) 717 |

*Fig. 7*

|  | Year 800 | | | Region 801 | | Total 802 |
|---|---|---|---|---|---|---|
|  | 1990 (803) | 1991 (804) | Growth 805 | West 806 | East 807 |  |
| *Retail 808* |  |  |  |  |  |  |
| ACME 809 | 1,115 | 1,331 | 19% | 1,111 | 1,225 | 2,446 |
| Bob's Discount 810 | 152 | 642 | 322% | 222 | 572 | 24,468 |
| *Wholesale 811* |  |  |  |  |  |  |
| ABC Inc. 812 | 11,156 | 13,312 | 19% | 11,111 | 12,257 | 24,468 |
| XYZ Ltd. 813 | 1,523 | 6,421 | 322% | 2,222 | 5,722 | 7,944 |
| *Grand Total 814* | 13,946 | 21,706 | 56% | 14,666 | 19,786 | 35,653 |

*Fig. 8*

|  |  | 2001 1200b | 2002 1200c | Total 1201b | Type 1202b | | Yearly Growth 1204b |
|---|---|---|---|---|---|---|---|
|  |  |  |  |  | Fresh 1203b | Frozen 1203c |  |
| Retail 1250b | Exports 1252b |  |  |  |  |  |  |
|  | West 1253b | 100 | 200 | 300 | 150 | 150 | 100% |
|  | East 1253c | 150 | 250 | 400 | 200 | 200 | 66% |
|  | Imports 1252c |  |  |  |  |  |  |
|  | West 1253d | 110 | 220 | 330 | 170 | 160 | 100% |
|  | East 1253e | 160 | 260 | 420 | 210 | 210 | 63% |
|  | Net Deficit 1254b | 20 | 30 | 50 | 30 | 20 | 100% |
| Wholesale 1255b |  | 400 | 440 | 840 | 420 | 420 | 10% |

*Fig. 10*

|  |  | [Year] 1200a | Total 1201a | Type 1202a | Yearly Growth 1204a |
|---|---|---|---|---|---|
|  |  |  |  | [Type] 1203a |  |
| Retail 1250a | [Category] 1251a | Category 1252a |  |  |  |
|  |  | [Region] 1253a | Sum([Sales]) | Sum([Sales]) | [Growth] |
|  | Net Deficit 1254a |  | Sum([Sales]) | Sum([Sales]) | Avg([Growth]) |
| Wholesale 1255a |  |  | Sum([Sales]) | Sum([Sales]) | Avg([Growth]) |

*Fig. 11*

|  |  | Dynamic Column Group 1200 | Static (Footer) Column 1201 | Static Column 1202 | Static Column 1204 |
|---|---|---|---|---|---|
|  |  |  |  | Dynamic Column Group 1203 |  |
| Static Row 1250 | Static (Header) Row 1252 | Detail Cell | Detail Cell | Detail Cell | Detail Cell |
|  | Dynamic Row Group 1253 | Detail Cell | Detail Cell | Detail Cell | Detail Cell |
| Dynamic Row Group (Omitted header) 1251 |  | Detail Cell | Detail Cell | Detail Cell | Detail Cell |
|  | Static Row 1254 | Detail Cell | Detail Cell | Detail Cell | Detail Cell |
| Static Row 1255 |  | Detail Cell | Detail Cell | Detail Cell | Detail Cell |

*Fig. 12*

SYSTEMS AND METHODS FOR FLEXIBLE REPORT DESIGNS INCLUDING TABLE, MATRIX AND HYBRID DESIGNS

CROSS-REFERENCE TO RELATED APPLICATION

This application is related to co-pending U.S. application Ser. No. 10/400,734, filed on Mar. 27, 2003, entitled "Defining a report based on data regions and including custom data in a report definition."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates to generating reports, and more particularly to techniques for creating report designs that can be populated with data in a computerized process, where the techniques allow for both flexibility in report design and simplicity in generating and understanding the design.

BACKGROUND OF THE INVENTION

In any enterprise, data regarding aspects thereof is accumulated over time. This data can be used to report the status of the enterprise. For example, with regard to a sales enterprise, sales data can be accumulated pertaining to each sale of an item, including the salesman, the customer, the region of the salesman, the region of the customer, the amount of the sale, the quantity of the item sold, the date of the sale, the date of the delivery of the sold item, and so on. Based on such sales data, then, it may be that a report is generated that details sales by year, by month, by customer by year, by item by quarter, by salesman by delivery date, by region by week, etc.

The data that populates a report will typically be accumulated in a database. A database, as the term is used here, is a storehouse for digitally recorded data. To filter the data in a database into properly organized columns and rows for a report, a report designer may specify, in a report design, the particular data that is desired from a database. For example, a report designer might specify that he wants a "salesman name" in the first column of a report.

The report designer may then write a program that recognizes the field indicated for the first column of a report design (salesman name), queries a database for all salesman names, and places them one after the other in the first column of a report. Instead of writing his own program to carry out this task, the report designer may use commercial software that provides this function. Such software may allow a report designer to simply specify, in a report design, a type of data he wants in the first report column. The commercial software will then automatically analyze the report design, query a database, and place the desired data in the first column of a report. This operation is also available in commercial products for any number of columns and/or rows of a report.

An exemplary report design is illustrated in FIG. 2. The exemplary report design provides a salesman column 201, a 1990 sales column 202, and a total sales column 205. This report design may be submitted to supporting software that can pull the corresponding data from a database to populate the actual report. An example of what such an actual report may look like is provided in FIG. 3. FIG. 3 shows a populated salesman column 301, a populated 1990 sales data column 302, and a populated total sales column 305.

Exemplary report processing software for populating a report design with appropriate data is depicted in FIG. 5. The report processing software 510 may comprise a plurality of data extensions for properly interpreting the data stored in any of a plurality of data sources 520 and 521, which could be, e.g., databases. The report processing software may also comprise a number of rendering extensions 512 to properly output reports in an appropriate file format, e.g., Hyper-Text Markup Language (HTML) 530, Extensible Markup Language (XML) 531, or some other file format 532. A report design 500, also referred to herein as a report definition, is used by the report processing software to gather the data from data sources 520, 521 and compile the data into a properly structured report, outputting the report in any file format 530, 531, 532.

Different reports are designed for differing types and amounts of data. While some reports are quite simple, others present multiple types of data, and may show complex relationships between the data. For an example of a common data relationship, with reference to FIG. 1, a single field in a first column, e.g., Acme 101a, may be associated with a number fields in a second column, e.g., 102a, 102b, and 102c. To achieve this, report processing software must be able properly locate data in the various fields of a report. Bob's Discount 101b cannot appear in a cell immediately underneath Acme 101a; instead Bob's Discount 101b must be properly situated to visually correspond to the Bob's Discount data, e.g., 102d, 102e, 102f. Thus, report processing software must be populate reports in ways that are more intelligent than simply lumping data in columns and rows. This example is a small taste of the potential complexity in report design, the full scope of which will be appreciated by those of skill in the art. It should be emphasized here that while the look of an actual report may appear simple, techniques for supporting report design with commercial software is not necessarily simple, because of the variety of desired designs and the need to accurately populate reports that are designed in varying ways.

While report designers can always create customized computer programs to properly populate a particular report, many report designers do not have the expertise or the desire to write such custom programs. Furthermore, it may not be an effective use of a report designer's time to write such computer programs. Therefore, report designers are frequently called on to either make do with the available report designs provided by a commercial software product, or spend valuable time creating computer programs for a custom report design. Flexibility in report design is therefore a desirable attribute for commercial report design software. Simplicity is also a desirable attribute, as with all software, because users can more readily access features that are easily understandable.

Due to the above described situation, commercial software companies are called upon to provide report design software that accommodates as many varieties of report designs as can practically be accommodated. This can be a difficult task. If done well, the task involves providing an easily understandable technique for specifying a report design that is both flexible and highly accurate in allowing designers to convey the content and layout of data for a report. Traditionally, this task has been resolved by providing two broad options for report design: the table and the matrix.

The following brief discussion in connection with FIG. 1 and FIG. 4 will point out some of the advantages and limitations of the traditional table report design and matrix report design. First, FIG. 1 shows some typical features of a report that can be generated using a table design. As suggested by FIG. 1, a table design allows report designers to use only fixed columns. These are referred to as static columns 104. In other words, a report designer using the table design can specify a column for customer 101, year 102, sales 103 and so on, as desired, to contain the all desired data for a report.

In contrast, the rows of a table can be dynamic. For example, refer to dynamic rows 105. These rows 105 can be expanded as necessary to adequately present greater or lesser amounts of report data. For example, with reference to dynamic rows 105: as time goes on, the years reported 102a and 102b may be expanded to also report the years 2003 and 2004. Additional rows can be added to provide all corresponding data for these rows in the report. This allows report designers to re-use a single report design from year to year, or to present data of varying scope using the same report design.

A table report design may also include header and footer rows. In FIG. 1, the top row specifying column names, e.g., customer 101, year 102, and sales 103, is a header row. The bottom row, specifying a grand total 101c of sales, is a footer row. Each of the header and footer rows contain cells with data of different types than the non-header/footer rows, and typically summarizes the data in those rows.

A table report design can further contain nested groups, each with a header and footer row. FIG. 1 illustrates this feature by giving nested header and footer rows for both customers 101a and 101b. The row with only Acme 101a and the row with only Bob's Discount 101b are both header rows. The two rows containing subtotals 102c and 102f are footer rows. Again, each of these nested header and footer rows 101a, 101b, 102c, 102f contain information that is different from the non-header/footer rows.

Finally, a table report design can specify detail rows within an innermost group. This aspect of a table design is not represented in the actual table of FIG. 1. An example of such a detail row is, e.g., if additional data is desired about 2001 sales 103a for Acme, a detail row could be specified in a report design that inserts additional information in a row beneath the row indicating 2001 sales 103a for Acme.

In summary, report designers using a table design in accordance with the present state of the art can specify fixed, or static, columns, along with either static or dynamic rows. Any number of header and footer rows are also available. The software that processes the report design will then place all specified data in the appropriate columns and rows. For dynamic rows as many rows as necessary may be generated to accommodate data.

The other design option available to report designers in conjunction with commercially available report-generation software is the matrix. An exemplary matrix that exposes the features of such a design is provided in FIG. 4. As can be surmised from the actual report of FIG. 4, the report design for a matrix allows dynamic columns 450. The columns containing yearly sales data for 2001 (401) and 2001 (402) that can be supplemented as necessary for additional years. For example, if data is available for 2003 and 2004, such data can be automatically added to the report, without the need to specify additional columns for these years in the report design. Each column group in a matrix can contain a header 430 and a footer 430. Note, however, that the dynamic columns of a matrix, while providing an advantage over the table design, do not give as much flexibility as could be desired in report design. For example, using current commercial report design software, dynamic columns 450 cannot contain nested dynamic columns. While a custom program could be written to accomplish this on a case-by case basis, generating such a custom program presents a formidable hurdle for a report designer.

A matrix report design also permits both static and dynamic rows, e.g., 470 and 460, respectively. In FIG. 4, a header 440 is provided for column names, e.g., 2001 (401), 2002 (402) and total (403). The row groups corresponding to the retail and wholesale sections are not provided with row headers and footers, although they could be. A footer row 470 is provided for grand total 422 data. Elements 404 and 423 are instances of a dynamic row group 460. In this regard, one or more rows in a matrix can be specified as a dynamic row in a report design. When combined with data, such a dynamic row can be expanded to accommodate available data. In the example of FIG. 4, the available data apparently contained retail 404 and wholesale 413 data. However, note that dynamic rows 460 contain only static nested rows 461. The present state of the art is incapable of accommodating dynamic nested rows in a matrix report design. Moreover, the state of the art does not allow any number of further combinations of static and dynamic rows that may be desired in report designs.

In summary, a matrix allows for presentation of report data with a number of fixed rows or simple dynamic rows that can be further delineated by row headers and footers. Static or dynamic columns can be used to display data, as necessary. The dynamic columns/rows may also be further delineated by header and footer columns to provide additional related information in a report.

The table and matrix report design therefore each provide some useful features, but are limited in the ways they allow report designers to specify the features of a report. A more flexible format for report designs that is at the same time simple to understand will help to improve reports by permitting a broader range of designs that can be easily implemented via standardized commercial software that does not require customized additions to properly present the data of a report.

In light of the current state of the industry in support for report designs, there is a heretofore unrecognized need to provide additional flexibility and simplicity in supporting the various report designs that may be desired for the presentation of data.

SUMMARY OF THE INVENTION

Systems and methods are provided for designing reports. Columns and/or rows of a report or of a region of a report can be declaratively defined as either dynamic or static. The declarative definition can be represented by any marking. For example, brackets, text font, text color, some other marking, or the absence thereof could be designated as a declaration. If a column or row is declaratively designated as dynamic, it can be expanded into a plurality of columns or rows. This expansion may be used as necessary to accommodate the data with which a report design is used. If a column or row is designated as static, it remains as a single column or row to represent only the specified column or row data.

In addition, subgroups of columns and rows can also be declaratively defined as dynamic or static, as desired by a report designer. A static column may not contain sub-columns, or it may contain a plurality of static columns, a plurality of dynamic columns, or any combination of both. Similarly, a dynamic column may also contain any number of static columns, any number of dynamic columns, or any combination of both, which indicates that each of the dynamic columns, on expansion, will contain the designated sub-columns. The same applies for rows.

BRIEF DESCRIPTION OF THE DRAWINGS

FIG. 1 illustrates a report that can be generated using a table report design. The report design for such a report is characterized by static columns, dynamic rows, and any number of row headers and footers.

FIG. 2 illustrates an exemplary report design. This design indicates a report with three columns. When processed by report processing software, an actual report is generated which is populated with data. An example of such an actual report is provided in FIG. 3.

FIG. 3 illustrates an actual report that has been generated by hypothetical report processing software using the exemplary report design from FIG. 2. The report processing software has gathered the data corresponding to the columns designated in FIG. 2, and placed the data in columns.

FIG. 4 illustrates a report that can be generated using a matrix report design. The report design for such a report is characterized by dynamic columns with column headers and column footers, and by potentially dynamic rows with row headers and row footers. Note that only static rows 461 are nested in dynamic rows 460.

FIG. 7 illustrates an exemplary report design that uses various techniques of the invention to provide a report on yearly and regional sales.

FIG. 8 illustrates an actual report that may be generated using the design of FIG. 7.

FIG. 10 illustrates a report that is generated using some of the various design techniques provided. FIG. 10 is an example of a report that may be generated from a report design such as that in FIG. 11.

FIG. 11 illustrates an exemplary report design that declares certain columns, rows, subcolumns, and subrows to be dynamic or static. An exemplary report that may be generated from such a design is provided in FIG. 10.

FIG. 12 illustrates the content types of the various items in the report design of FIG. 11. Columns, subcolumns, rows, and subrows in a report design can be declared as either dynamic or static to produce a report such as that of FIG. 10.

DETAILED DESCRIPTION OF ILLUSTRATIVE EMBODIMENTS

Figure 5:
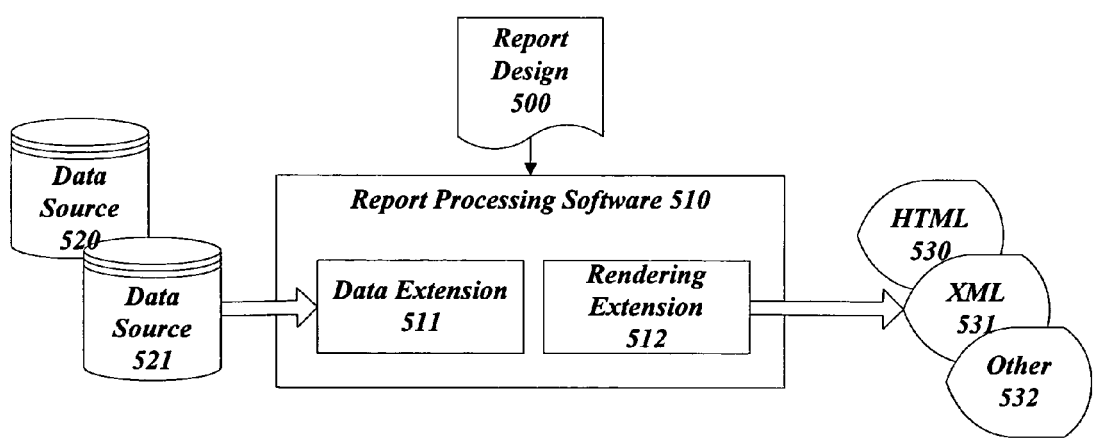
FIG. 5 illustrates the process of combining a report design with data to generate an actual report. Report processing software determines the data that is called for by a report design, gathers the appropriate data from data sources, populates an actual report, and outputs an actual report. A data extension can be used to understand the data from the data source, while a rendering extension can be used to generate an actual report in a requested file format.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

A report is a compilation of data for display in columns and rows on a visual surface. The data in a report can be any data. A typical report may include financial data for an enterprise, such as gross revenue for the sales of various products, expenses associated with various products, profits associated with various products, and the like. Other reports may include customer information, such as names, contact information including telephone numbers, addresses, and email addresses, as well as product preferences, gross annual purchases, special discounts, and so on. A report may also be used to track employees, by compiling employee names, hours worked, accomplishments, scheduled vacation time, special needs, etc. These examples are a very small subset of the possible data that may be included in a report. Any data that humans may desire to compile regarding any endeavor can be placed in a report. Further examples of actual reports are provided in the Figures at FIG. 1, FIG. 3, FIG. 4, and FIG. 8. The reports in the figures display somewhat less data than the typical report, for ease of illustration. A more typical report may include tens, hundreds, or thousands of rows and columns, as necessary to display all the data for a report.

A report may be divided into regions, and the various regions of a report may be designed according to differing report designs. Further, a single report design may specify various regions within a report that follow different designs. This feature of reports is explained in greater detail in U.S. patent application Ser. No. 10/400,734. For the purpose of this document, the term report should be construed to mean both an entire and complete report, or a region of a report that conforms to a homogeneous set of design choices.

A report design is a template for a report that shows what data will be displayed in an actual report and the layout of the data. A report design can comprise a computer readable set of instructions in a proper computer readable syntax, such as XML or HTML. An example of this embodiment of a report design is provided below in this specification. Such a design may also be embodied graphically, for example, as in FIG. 10, which is a graphic embodiment of the computer readable instruction set provided herein. In the case of a graphically represented report design, report design software is typically used as an aid in supplying report design parameters and generating a report definition file.

Report design software typically uses a GUI for graphically representing a report design. For example, report design software may present a designer with a number of empty columns and rows on a computer screen GUI. A designer may select any of the various columns and rows using a mouse or other control device. A designer may then enter data that is desired for a report by selecting from a plurality of menu options, or by identifying the data directly through typing identification information with a keyboard input. The information that a report designer enters using various input devices may then be stored in a report definition file. This file provides a compact representation of the report definition created by a report designer, and may be in any number of file formats, e.g., XML, HTML, .txt, .doc, etc.

A simple report design may indicate a plurality of columns for a table, such as in FIG. 2. A report design, whether generated directly or with the aid of report design software, can be used by report processing software to generate an actual report by populating the appropriate columns and rows indicated in a report design with appropriate data. Report processing software includes any software for compiling a report. Some general aspects of report processing software suitable for use with other aspects of the invention are displayed in FIG. 5. Such software 510 performs the function of querying a data source 520, 521 to retrieve data that is specified in a report design or report definition 500. One or more data extensions 511 may be used to properly interpret data from a data source 520, 521. The software 510 then compiles the retrieved data into a layout specified by the report definition 500. The output report may be rendered into any file format, e.g., 530, 531, 532 using one or more rendering extensions 512. Those of skill in the art will acknowledge that separate software components, such as objects created in a language that supports object oriented programming, can be used to perform the various functions of report processing software 510.

Figure 6:
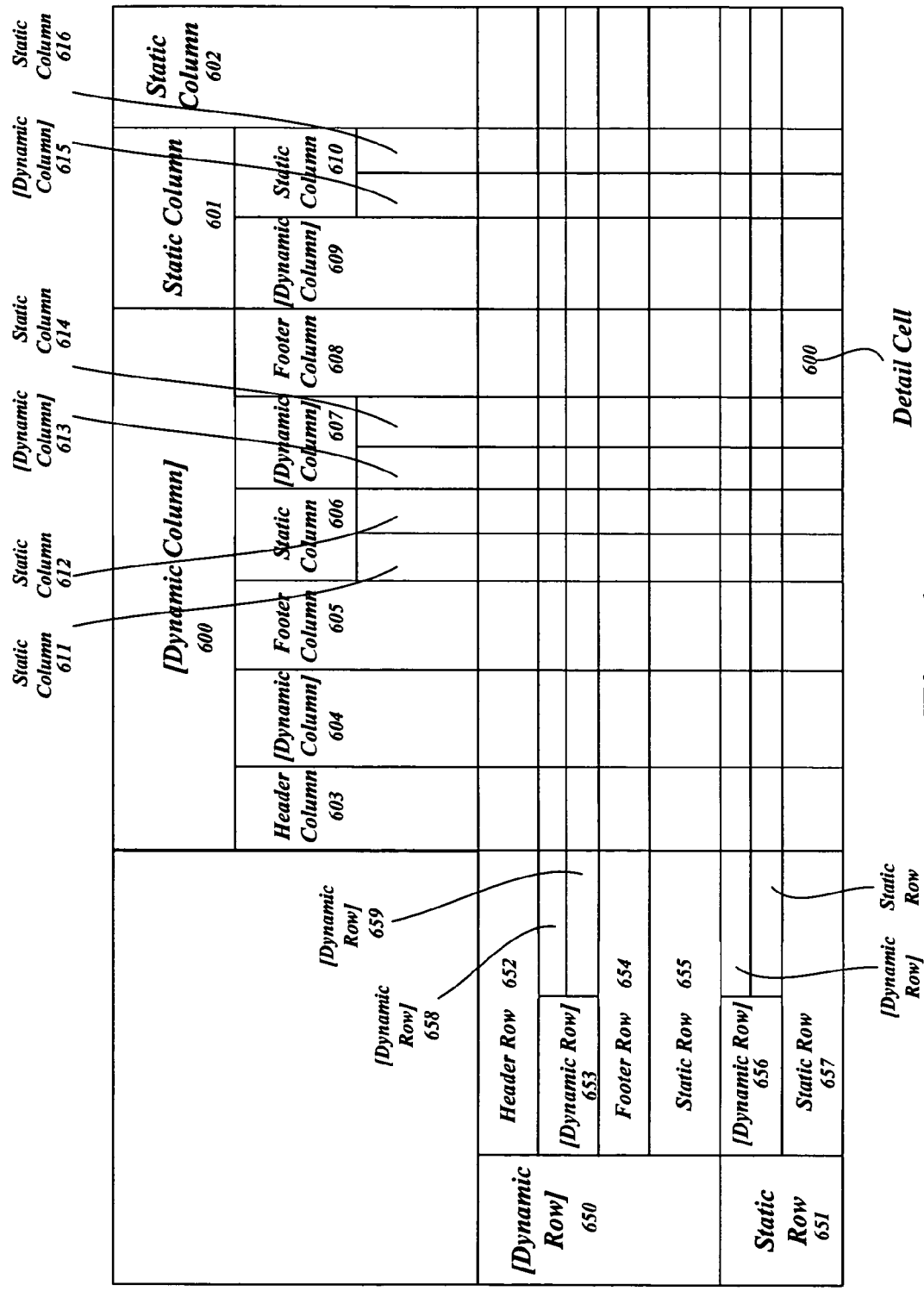
FIG. 6 illustrates a generalized report design that implements the design techniques of the invention.

The embodiment illustrated in FIG. 6 is intended to provide numerous aspects of the invention for clear enabling explanation. The illustrated report design is not the only report design that can be made using the techniques disclosed herein. On the contrary, the techniques of the invention are intended to support flexible report design that is adaptable to the infinite varieties of reports that may be desired by report designers. The exemplary design of FIG. 6 is useful because it demonstrates many of potential features of a report design. In practice, however, the design of FIG. 6 may be somewhat unwieldy. Several of the features of FIG. 6 may be used, while others are not used, to produce a simple and understandable report. FIG. 6 therefore is intended more as a demonstration of aspects of the invention than as a concrete practical example of the use of the invention. Additional report designs using the techniques of the invention, directed to more practical embodiments of real-world reporting, are provided in FIG. 7 and FIG. 11. A code version of FIG. 11 is presented in this specification, below.

As illustrated in FIG. 6, using the techniques provided by aspects of the invention, columns and rows may be declaratively defined as dynamic or static. In FIG. 6, brackets [ ] are used to declaratively define a column or row as dynamic, while the absence of brackets is used to declaratively define a column or row as static. The purpose of the declaration is at least twofold: first, it allows a report designer to easily see which columns and rows are dynamic and which are static. Second, it can be used by report processing software to identify which columns and rows are static and which are dynamic for the purpose of populating a report with data.

In various embodiments of the invention, one or more declarations that may be used to identify a column or row as dynamic or as static can be standardized in an Extensible Markup Language (XML) schema or XML Document Type Definition. This allows report designers to use the standardized declaration(s) and be assured that their design will be properly processed by report design software that is instructed to recognize the declaration(s). For example, if brackets [ ] are defined in an XML schema as an attribute that identifies a dynamic row or column, then report designers can place brackets [ ] in the rows and columns that they wish to be dynamic, and those dynamic rows and columns will be interpreted as such by report processing software. Rows and columns without the brackets [ ] would not be identified as dynamic, and could therefore be identified as static rows and columns by default.

A declaration can be any marking. As briefly discussed in the summary section, such a marking might be brackets, text font, text color, some other marking, or the absence thereof. In addition, text point size, the presence of a particular symbol such as a star * or a letter (D), or the use of an identifying word, e.g., "dynamic" or "static" could be used to declare a column or row to be dynamic or static. The invention is not limited to the particular marking used to declaratively define a column or row as dynamic or static. Instead, the invention comprises the use of any declaration to identify a column or row as dynamic or static in a report design.

A column of a report is a vertical band in which related report data is located. A column may be identified by a column heading in a top row of a column. A column may be divided into subgroups of columns, which may themselves be further be divided into subgroups down to any level of subgrouping. Therefore, a first column for "cars" may be divided into FORD® and TOYOTA® subgroups. Each of these columns may be further divided into model subgroups, such as FOCUS®, TAURUS®, and BRONCO® in the FORD® column and CAMRY®, COROLLA®, and TERCEL® in the TOYOTAS® column. Each of these model columns may be further divided into colors, such as red, blue, and green. The further division of columns may continue as necessary to any level of subgrouping. This concept is represented in FIG. 6 by, for example, column 600, which is divided into columns 603, 604, 605, 606, 607, and 608. Column 607 is further divided into columns 613 and 614. Each of these columns, whether a top-level column or a column that exists at some level of subgrouping, is referred to here as a column. Where necessary for the purpose of discussion, the term subgroup column, nested column or the like will be used to point out the appropriate feature of a column.

Similarly, a row of a report is a horizontal band in which related report data is located. A row may be identified by a row heading in a first column of a row. A row may be divided into subgroups of rows, which may themselves be further be divided into subgroups down to any level of subgrouping. Therefore, a first row for "cars" may be divided into FORD® and TOYOTA® subgroups. Each of these rows may be further divided into model subgroups, such as FOCUS®, TAURUS®, and BRONCO® in the FORD® row and CAMRY®, COROLLA®, and TERCEL® in the TOYOTA® row. Each of these model rows may be further divided into colors, such as red, blue, and green. The further division of rows may continue as necessary to any level of subgrouping. This concept is represented in FIG. 6 by, for example, row 650, which is divided into rows 652, 653, 654, and 655. Row 653 is further divided into rows 658 and 659. Each of these rows, whether a top-level row or a row that exists at some level of subgrouping, is referred to here as a row. Where necessary for the purpose of discussion, the term subgroup row, nested row, or the like will be used to point out an appropriate feature of a row.

A column or row that is declared to be static in a report design, such as that of FIG. 6, will not be expanded into multiple columns or rows by report processing software when generating an actual report. Referring back to the discussion of declarative definitions, above, recall that a column or row can be declared as static by any marking or absence thereof. Consider column 602 from FIG. 6, which has been declared to be a static column by the absence of brackets [ ]. This feature implies that when generating an actual report from the design of FIG. 6, there will be only one static column 602.

For example, imagine that column 602 is designated to list employee primary email addresses. Each employee has only one primary email address. There may be other email address information available in a database, such as secondary or tertiary email addresses, but those addresses are not desired for the report. To achieve this, a static column can be identified, such as 602, and the contents of the column can be identified as "primary email address." Report processing software that generates an actual report from such a design will retrieve primary email addresses from a database, and place them in the column. It will not attempt to retrieve additional email addresses or generate additional columns of the actual report to accommodate additional email addresses.

The same principle discussed with regard to static column 602 applies to static rows. A static row is one that will not be expanded into multiple rows by report processing software. Consider static row 657. This row may be identified to contain information, such as "primary product ID." There may be multiple product IDs stored in a database for various products, but those IDs are not desired for the actual report. The row is a static row, so multiple rows will not be generated to convey various product IDs.

In contrast, a column or row that is declared to be dynamic in a report design, such as 609, may be duplicated as necessary to accommodate all available data for the specified column or row. Consider column 615, which is declaratively defined as a dynamic column. The report designer may have determined that data will go in the report that may span multiple columns. However, the number of columns needed may not be known, or may be variable, or may be simply so large that entry of all such columns in a report design would be onerous. In such situations, a report designer can specify a dynamic column 615. This column can be automatically expanded into multiple columns by report processing software. The expansion can be made as necessary, to accommodate all data that is specified for a dynamic column.

For example, if column 615 was designated for yearly sales data, there may be a large number of years for which such data is known, and moreover additional data will be added to a database as years pass. Instead of specifying a static column for every year of desired data, a report designer can specify a dynamic column that is named, for example, [yearly sales]. A report designer can further specify a range of desired data, e.g., 1990-2001, or simply specify that all available data fitting the description is desired. Report processing software, on generating an actual report from the design of FIG. 6, can then generate multiple yearly sales columns in the location of dynamic column 615. A first column may correspond to 1990 sales, a second column may correspond to 1991 sales, and so on. In this regard, dynamic columns may be used in conjunction with data that is organized such that queries can be performed against it for the desired data for the multiple columns. Such queries are in the purview of report generation software.

Again, this principle can be applied to dynamic rows. A dynamic row is a row identified in a report design as expandable into multiple rows by report processing software. For example, dynamic row 660 can be expanded as necessary according to the data that is retrieved by report processing software. If dynamic row 660 is for the purpose of representing "yearly team leaders" indicating a team leader for production of products identified in the columns, then the dynamic row 600 can be expanded to accommodate 1990 team leaders, 1991 team leaders, 1992 team leaders, and so on as necessary in multiple rows. A report designer need not specify each and every year, and can instead specify a range of desired data, such as 1990-1997, or simply specify all available data.

Aspects of the invention allow report designers to declare both dynamic and static rows and columns in a report design, as desired for a particular report. Moreover, any combination of nested dynamic and static rows or columns may be declared within another row or column, respectively. For example, dynamic columns may contain both dynamic and static nested columns.

This ability to nest both dynamic and static columns in a dynamic column is illustrated in FIG. 6. Dynamic column 604 is nested in dynamic column 600. In generating an actual report, the dynamic column 600 can be expanded to any number of columns, as necessary to report the data. This expansion of dynamic column 600 will generate a plurality of instances of dynamic column 604. Each instance of dynamic column 604 may then be expanded to accommodate the appropriate data for that instance of dynamic column 604.

Static columns, such as 606, can also be nested in dynamic columns, such as 600. In generating a report for such a report design, a single static column 606 can be placed in each expanded instance of dynamic column 600. When populating the report, the report processing software can first expand the dynamic column 600, and then populate the nested columns such as static column 606 as appropriate.

From the above explanation and from an examination of FIG. 6, it should be clear that a dynamic column can contain no nested columns, one or more static columns, one or more dynamic columns, or any combination of static and dynamic columns. The same is true of static columns. A static column may contain a dynamic column. An example of this is static column 601 which contains dynamic column 609. A situation such as this in a report design will generated a single static column which contains an expandable subgroup of columns. Similarly, a static column may contain no nested columns, such as static column 602, it may contain one or more dynamic columns, one or more static columns, or any combination of the two.

While the above discussion has focused on columns for simplicity, it should be equally clear from FIG. 6 that rows may also contain any combination of dynamic and static nested rows. A dynamic row, such as 650, may contain other dynamic rows, such as 653. In this situation, dynamic row 650 may be expanded into multiple rows as necessary to accommodate the available data. Each instance of 650 will contain an instance of dynamic row 653. This nested dynamic row may then also be expanded, as necessary, to accommodate available data as requested for row 653.

Dynamic rows may also contain nested static rows. In this regard, dynamic row 650 contains nested static row 655. Each instance of 650, after expansion, will contain an instance of static row 653. Each instance of 653 can then be populated with data as appropriate. Note that in the case of both rows and columns, such nested categories need not contain the exact same data as all other instances of the nested row or column. Instead, the query used to populate the row or column may be modified to adapt to the instance of the dynamic parent row or column, to fill the nested rows or column with appropriate data for the particular instance.

Static rows may also contain dynamic rows. This is illustrated in FIG. 6 where static row 651 contains nested dynamic row 656. In this situation, just as with columns, the single static parent row 651 contains a dynamic row that can be expanded as necessary to accommodate specified data.

Note that in addition to displaying static and dynamic rows and columns, FIG. 6 shows row and column headers and footers. Such row and column headers and footers are in fact static rows and columns. This is indicated in FIG. 6 by the absence of brackets [ ] on the descriptors for the header and footer rows and columns. In general, rows and columns that are declared as dynamic or static using the techniques of the invention will not simply be named "dynamic row" or "static row" as illustrated in FIG. 6. Instead, such rows and columns can be named according to the data that is to be placed in them. In this regard, header row 652 indicates that it is a header describing data below it. Footer row 654 similarly conveys to a viewer of the report design that the data that will go in 654 is footer data for the data included in above rows. The same is true of header column 603 and footer column 605. These are static columns that have simply been named to describe, at least in part, the data that will be included in the columns. This concept is explained further with regard to FIG. 7 and FIG. 8.

FIG. 6 sets forth many aspects of the invention in the abstract, which is useful for explanation. FIG. 7 and FIG. 8 are included to give concrete examples of a report design and how it can be used by a report processor to generate an actual report. FIG. 7 sets forth an exemplary report design, and FIG. 8 illustrates how the design might be populated with data. These figures therefore further expose and clarify the advantages of the systems and methods for flexible report designs.

The exemplary report design of FIG. 7 shows three static top-level columns: Year 700, region 701, and total 702. The report design is directed to reports that show sales by year, sales by region, and total sales. The static column titled "year" 700 is further divided into two nested columns: a dynamic column for yearly sales 703, and a static column to show growth 704. The static column for region also contains a nested column: a single dynamic column for region 705, where "region" denotes regional sales. The static column for total contains no nested columns.

The rows of the report design in FIG. 7 are a dynamic category column 706 that contains a nested header column 707 and a dynamic store column 708. Therefore, each instance of 706, on expansion, will include an instance of 707 and 708, as can be seen with reference to FIG. 8. There is also a static row 709 for grand total data.

The detail cells in FIG. 7, elements 710-717, can provide additional information about the data that will populate the cells. While the information for the report could be gathered entirely from information provided in the row and column descriptors, information in detail cells provides an additional design option. Thus, it may not be required to place any information in a detail cell such as 710, because it is clear from the context that the information for that cell is sales information for a particular store for a particular year. However, the Grand Total row is less transparent. For example, it may not be clear that an average growth Figure is desired for cell 713 if that information were not provided in a detail cell.

FIG. 8 provides an actual report that might be generated from the report design of FIG. 7. The dynamic column for yearly sales 703 has been expanded into two columns, for 1990 (803) and for 1991 (804). The dynamic column for region 705 has been expanded into two columns, west 806 and east 807. In addition, the Category dynamic row 706 has been expanded into two categories: Retail 808 and Wholesale 811. Note that while the titles in the static columns 700, 701, and 702 have remained in the actual report, see 800, 801, and 802, the title for the category row 706 has been dispensed with in the actual report of FIG. 8. This is a matter of presentation preference, which can be accomplished by an additional declarative marking, such as italics, in conjunction with the invention.

In FIG. 8, the dynamic rows for store have been expanded within each of the dynamically expanded category rows, to two stores per category. This could hypothetically have been the result of a restriction indicated in the report design, e.g., in column 708, which may have indicated an interest in only the top two stores in each category. It may have also been a result simply of available data—the data for those four stores may be the only data available. In the former case, the limitation would be stated or declared in the row description, in the latter, no declaration is necessary.

FIG. 10, FIG. 11, FIG. 12, and the exemplary XML report definition provided below provide a final example of a report design that implements various techniques of the invention. FIG. 10 provides an exemplary report that can be produced from the report design of FIG. 11. FIG. 11 represents schematically that which may be implemented in XML, as set forth below. FIG. 12 exposes the object types in the schematic representation provided by FIG. 11.

The numbering of the columns and rows of FIG. 10, FIG. 11, and FIG. 12 has been orchestrated to demonstrate the analogous elements of those figures. For example, the dynamic column group 1200 from FIG. 12 corresponds to the [year] 1200*a* column in FIG. 11 and to the 2001 (1200*b*) and 2002 (1200*c*) columns in FIG. 10. This correlation is intended to allow easy reference between the figures, and to show how a column 1200*b* identified in a report design can both identify the data intended for the actual report (here, yearly sales data), and also declaratively identify (here, by brackets) that the column is intended as a dynamic column.

FIG. 11 shows a static column 1202*a* for a header that reads "Type", which contains a dynamic column 1203*a* for type subgroupings. As can be seen in FIG. 10, these type subgroupings are "fresh" 1203*b* and "frozen" 1203*c*. This example illustrates a functional advantage of report design using the techniques of the invention.

FIG. 11 also provides several static columns 1201*a* and 1204*a*, as can be verified by reference to FIG. 12, which identifies the columns 1201 and 1204 as static. Note here that the footer 1201 column is simply one example of a static column. Static columns such as 1204 may also be provided for the purpose of placing information in a report that is not related to surrounding data.

The rows of the report design provided in FIG. 11 also incorporate some of the techniques of the invention, allowing for flexible report design. As such, a static row 1250*a* can contain a dynamic row group 1251*a*. Further, a dynamic row 1251*a* can contain both static rows 1252*a* and dynamic rows 1253*a*. This permits the repeatable listing of header rows and sub-rows as illustrated in FIG. 10. The static row 1252*a* from the report design is repeated once in every dynamically expanded group in FIG. 10. Refer to 1252*b* and 1252*c* in FIG. 10. The dynamic row 1253*a* is repeated as necessary to accommodate the data in FIG. 10. Refer to 1253*b*, 1253*c*, 1253*d*, and 1253*e* in FIG. 10. This concrete example of a single report design using techniques of the invention does not make use of all potential combinations of static and dynamic rows and or columns, however, the advantages of the techniques over prior report design systems and methods should be clear.

The XML definition below demonstrates how the elements of a report implementing the techniques of the invention may be embodied in a machine readable language. The declarations made schematically are reduced to elements and attributes declared in an XML file. Report designers using aspects of the invention may use a program that allows for schematic preparation and prepares a definition file, such as the example below, in an automated process. Alternatively, the invention may be practiced by directly writing report definition files without the aid of report design software. In referring to the example below, the term "tablix" has been coined to declare an instance of a report design using the techniques described herein.

Exemplary XML Definition for FIG. 10, FIG. 11, and FIG. 12:

```
<Tablix>
    <RowGroupings>
        <Grouping>
            <Header>Retail</Header>
            <SubGroupings>
                <Grouping>
                    <GroupBy>=Category</GroupBy>
                    <SubGroupings>
                        <Grouping>
                            <StaticType>header</StaticType>
                            <Header>=Category</Header>
                        </Grouping>
                        <Grouping>
                            <GroupBy>=Region</GroupBy>
                            <Header>=Region</Header>
                        </Grouping>
                    </SubGroupings>
                </Grouping>
                <Grouping>
                    <Header>Net Deficit</Header>
                </Grouping>
            </SubGroupings>
        </Grouping>
        <Grouping>
            <Header>Wholesale</Header>
        </Grouping>
    </RowGroupings>
    <ColumnGroupings>
        <Grouping>
            <GroupBy>=Year</GroupBy>
            <Header>=Year</Header>
        </Grouping>
        <Grouping>
            <StaticType>footer</StaticType>
            <Header>Total</Header>
        </Grouping>
        <Grouping>
            <Header>Type</Header>
            <SubGroupings>
                <Grouping>
                    <GroupBy>=Type</GroupBy>
                    <Header>=Type</Header>
                </Grouping>
            </SubGroupings>
        </Grouping>
        <Grouping>
            <Header>Yearly Growth</Header>
        </Grouping>
    </ColumnGroupings>
    <Rows>
        <Row>
            <Cell/>
            <Cell/>
            <Cell/>
            <Cell/>
        </Row>
        <Row>
            <Cell>=Sum(Sales)</Cell>
            <Cell>=Sum(Sales)</Cell>
            <Cell>=Sum(Sales)</Cell>
            <Cell>=Growth</Cell>
        </Row>
        <Row>
            <Cell>=Sum(Sales)</Cell>
            <Cell>=Sum(Sales)</Cell>
            <Cell>=Sum(Sales)</Cell>
            <Cell>=Avg(Growth)</Cell>
        </Row>
        <Row>
            <Cell>=Sum(Sales)</Cell>
```

-continued

```
            <Cell>=Sum(Sales)</Cell>
            <Cell>=Sum(Sales)</Cell>
            <Cell>=Avg(Growth)</Cell>
        </Row>
    </Rows>
</Tablix>
```

Exemplary Computing Environment

The techniques of this invention are intended for use in connection with one or more computers. In particular, report design products implementing the methods disclosed herein are likely to provide a Graphical User Interface (GUI) to assist in the use of declarative elements to specify the qualities of a report as taught by this specification. Such a graphical user interface and the supporting computing hardware and software is well known in the art, and the following brief description is provided to more specifically point out the features of such a system, without endeavoring to describe in detail the operation of well known and understood computing technology.

Figure 9:
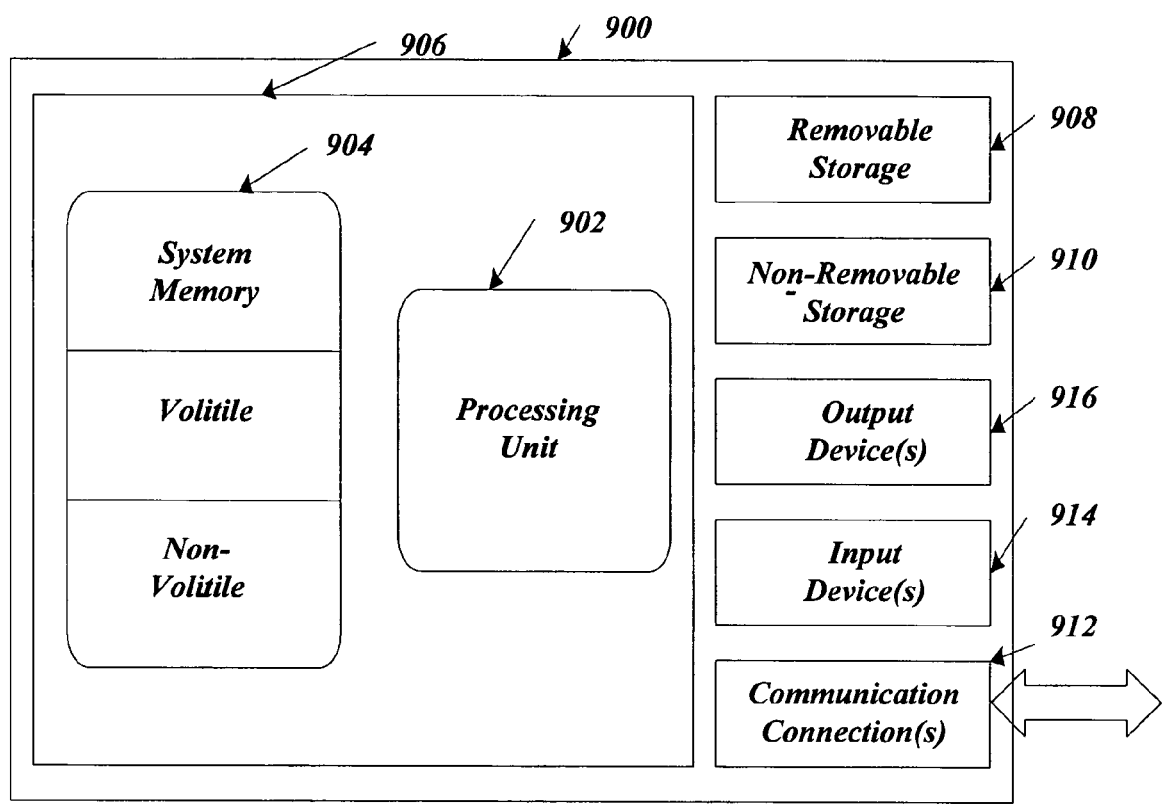
FIG. 9 illustrates the most basic attributes of an exemplary computing environment suitable for use in connection with the various aspects of the invention.

With reference to FIG. 9, an exemplary system for implementing the invention includes a computing device, such as device 900. In its most basic configuration, device 900 typically includes a processing unit 902 and memory 904. Depending on the exact configuration and type of computing device, memory 904 may be volatile (such as RAM), non-volatile (such as ROM, flash memory, etc.) or some combination of the two. Additionally, device 900 may also have mass storage (removable 908 and/or non-removable 910) such as magnetic or optical disks or tape. Similarly, device 900 may also have input devices 914 such as a keyboard and mouse, and/or output devices 916 such as a display that presents a GUI, as described above, as a graphical aid in facilitating report design. Other aspects of device 900 may include network connections to other devices, computers, networks, servers, etc. using either wired or wireless media. All these devices are well know in the art and need not be discussed at length here.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed is:

1. A processor implemented method for designing and generating a report, comprising:
   declaring, in a report design, data to be placed in at least one column, wherein said declaring comprises at least one first word and further comprises a first human readable declarative marking comprising a non-word marking applied to the at least one first word to indicate whether or not the at least one column can be automatically expanded into a plurality of columns when generating a report from said report design, as necessary to dynamically accommodate present and future data in a database that is identifiable by said at least one first word;
   declaring, in the report design, data to be placed in at least one row, wherein said declaring comprises at least one second word and further comprises a second human readable declarative marking comprising a non-word marking applied to the at least one second word to indicate whether or not the at least one row can be automatically expanded into a plurality of rows when generating said report from said report design, as necessary to dynamically accommodate present and future data in said database that is identifiable by said at least one second word;
   declaring, in the report design, data to be placed in at least one nested row, wherein said declaring comprises at least one third word and further comprises a third human readable declarative marking comprising a non-word marking applied to the at least one third word to indicate whether or not the at least one nested row can be automatically expanded into a plurality of nested rows when generating said report from said report design, as necessary to dynamically accommodate present and future data in said database that is identifiable by said at least one third word;
   processing said report design using report processing software to query said database for said data to be placed in at least one column, for said data to be placed in at least one row, and for said data to be placed in at least on nested row;
   interpreting data retrieved from said database by at least one data extension of a plurality of data extensions included in said report processing software, each data extension corresponding to a type of data source;
   generating said report by said report processing software, wherein said generating comprises at least responding to said first declarative marking by generating a plurality of columns to dynamically accommodate data in said database that is identifiable by said at least one first word; and
   rendering said report in an output file format by at least one rendering extension of a plurality of rendering extensions included in said report processing software, each rendering extension corresponding to a report output type.

2. The method of claim 1, wherein said declaring data to be placed in at least one column and said declaring data to be placed in at least one row comprises entering data via a graphic user interface (GUI) that graphically represents the report design.

3. The method of claim 1, wherein said declaring data to be placed in at least one column and said declaring data to be placed in at least one row comprises an Extensible Markup Language (XML) declaration.

4. The method of claim 1, wherein said first, second, and third declarative markings comprise a standard marking defined in an XML schema document.

5. The method of claim 1, further comprising declaring, in the report design, data to be placed in at least one nested column, wherein said declaring comprises at least one fourth word and further comprises a fourth human readable declarative marking to indicate whether or not the at least one nested column can be automatically expanded into a plurality of nested columns when generating a report from said report design, as necessary to accommodate data in a database.

6. The method of claim 1, further comprising providing a limit on an expansion of columns into a plurality of columns by specifying a range of data that will be represented in said plurality of columns.

7. The method of claim 1, further comprising providing a limit on an expansion of rows into a plurality of rows by specifying a range of data that will be represented in said plurality of rows.

8. A computer readable storage medium comprising instructions that are executable by a computer for processing reports, said instructions comprising:
   instructions for reading a report design;
   instructions for recognizing a first word and a first human readable declarative marking comprising a non-word marking applied to the first word in said report design, wherein said first declarative marking is associated with at least one column, and wherein said first declarative marking indicates whether the at least one column can be automatically expanded into a plurality of columns when generating a report from said report design, as necessary to dynamically accommodate present and future data in a database that is identifiable by said first word;
   instructions for generating a plurality of columns as necessary to dynamically accommodate data in said database that is identifiable by said first word when the first declarative marking associated with said at least one column is recognized;
   instructions for recognizing a second word and a second human readable declarative marking comprising a non-word marking applied to the second word and associated with at least one nested column, wherein said second declarative marking indicates whether the at least one nested column can be automatically expanded into a plurality of nested columns when generating said report from said report design, as necessary to dynamically accommodate present and future data in said database that is identifiable by said second word;

instructions for generating said plurality of nested columns as necessary to dynamically accommodate data in said database that is identifiable by said second word when the second declarative marking associated with said at least one nested column is recognized;

instructions for recognizing a third word and a third human readable declarative marking comprising a non-word marking applied to the third word in said report design, wherein said third declarative marking is associated with at least one row, and wherein said third declarative marking indicates whether the at least one row can be automatically expanded into a plurality of rows when generating said report from said report design, as necessary to dynamically accommodate present and future data in said database that is identifiable by said third word;

instructions for generating a plurality of rows as necessary to dynamically accommodate data in a database that is identifiable by said third word when the third declarative marking associated with said at least one row is recognized;

instructions for processing said report design using report processing software to query said database for data identifiable by said first word, second word, and third word;

instructions for interpreting data retrieved from said database by at least one data extension of a plurality of data extensions included in said report processing software, each data extension corresponding to a type of data source;

instructions for generating said report by said report processing software, wherein said generating comprises at least responding to said first declarative marking by generating a plurality of columns to dynamically accommodate data in said database that is identifiable by said at least one first word; and instructions for rendering said report in an output file format by at least one rendering extension of a plurality of rendering extensions included in said report processing software, each rendering extension corresponding to a report output type.

9. A computer readable medium according to claim 8, further comprising instructions for providing a GUI which allows for entry of declarative markings in a report design that is visually represented on the GUI.

10. A computer readable medium according to claim 8, further comprising instructions for recognizing a fourth word and a fourth human readable declarative marking associated with at least one nested row, wherein said fourth declarative marking indicates whether the at least one nested row can be automatically expanded into a plurality of nested rows when generating a report from said report design, as necessary to accommodate data for the report, and instructions for generating said plurality of nested rows.

11. A computer readable medium according to claim 8, wherein said report design comprises an XML file.

12. A computer readable medium according to claim 8, further comprising instructions for recognizing a limit on an expansion of columns, wherein if such a limit is recognized, said generating a plurality of columns as necessary comprises only generating columns to accommodate the data specified in the limit on an expansion of columns.

13. A computer readable medium according to claim 8, further comprising instructions for recognizing a limit on an expansion of rows, wherein if such a limit is recognized, said generating a plurality of rows as necessary comprises only generating rows to accommodate the data specified in the limit on an expansion of rows.

14. A processor-means for designing and generating reports using declarative markings to indicate dynamic and static columns and rows, comprising:

means creating a report design;

means for placing a first word and a first human readable declarative marking comprising a non-word marking applied to the first word in a column in said report design, wherein said first human readable declarative marking declares whether said column is a dynamic column, and wherein a dynamic column can be automatically expanded into a plurality of columns by report processing software when generating a report from said report design, as necessary to accommodate data in a database that is identifiable by said first word;

means for placing a second word and a second human readable marking comprising a non-word marking applied to the second word in a nested column in said report design, wherein said first human readable declarative marking declares whether said nested column is a dynamic nested column, and wherein a dynamic nested column can be automatically expanded into a plurality of nested columns by report processing software when generating a report from said report design, as necessary to accommodate data in a database that is identifiable by said second word;

means for placing a third word and a third human readable marking comprising a non-word marking applied to the third word in a row in said report design, wherein said third human readable declarative marking declares whether said row is a dynamic row, and wherein a dynamic row can be automatically expanded into a plurality of rows by report processing software when generating a report from said report design, as necessary to accommodate data in a database that is identifiable by said third word;

means for processing said report design using report processing software to query said database for data identifiable by said first word, second word, and third word;

means for interpreting data retrieved from said database by at least one data extension of a plurality of data extensions included in said report processing software, each data extension corresponding to a type of data source;

means for generating said report by said report processing software, wherein said generating comprises at least responding to said first declarative marking by generating a plurality of columns to dynamically accommodate data in said database that is identifiable by said at least one first word; and means for rendering said report in an output file format by at least one rendering extension of a plurality of rendering extensions included in said report processing software, each rendering extension corresponding to a report output type.

15. A means for designing reports according to claim 14, wherein said means for creating a report design comprises a computer readable medium bearing computer executable instructions.

16. A means for designing reports according to claim 14, wherein said means for creating a report design further comprises means for displaying a graphical user interface which presents a visual report design to a report designer.

17. A means for designing reports according to claim 14, further comprising means for generating an XML file corresponding to said report design.

18. A means for designing reports according to claim 17, wherein said means for marking comprises a standard marking defined in an XML schema document.

19. A means for designing reports according to claim 14, further comprising means for placing a fourth word and a fourth human readable marking in a nested row in said report design, wherein said third human readable declarative marking declares whether said nested row is a dynamic nested row, and a dynamic nested row can be automatically expanded into a plurality of nested rows by report processing software when generating a report from said report design, as necessary to accommodate data in a database that is identifiable by said fourth word.

20. A means for designing reports according to claim 14, further comprising means for providing a limit on an expansion of columns into a plurality of columns.

21. A means for designing reports according to claim 14, further comprising means for providing a limit on an expansion of rows into a plurality of rows.

* * * * *